United States Patent
Noble

[19]

[11] Patent Number: 6,064,571
[45] Date of Patent: *May 16, 2000

[54] FAN DUCT MODULE

[75] Inventor: Scott L. Noble, Beaverton, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/074,951

[22] Filed: May 8, 1998

Related U.S. Application Data

[63] Continuation-in-part of application No. 09/015,423, Jan. 29, 1998.

[51] Int. Cl.[7] .................................................. H05K 7/20

[52] U.S. Cl. ..................... 361/695; 361/687; 361/688; 361/689; 361/690; 361/694; 174/16.1; 165/80.3; 454/184

[58] Field of Search ..................... 361/687, 688, 361/690, 694, 695, 719, 704, 720; 165/80.3, 185; 257/721, 722

[56] References Cited

U.S. PATENT DOCUMENTS

| | | | |
|---|---|---|---|
| 4,744,005 | 5/1988 | Milani | 361/687 |
| 5,107,398 | 4/1992 | Bailey | 361/687 |
| 5,409,419 | 4/1995 | Euchner et al. | 361/695 |
| 5,523,917 | 6/1996 | Searby | 361/687 |
| 5,566,377 | 10/1996 | Lee | 361/695 |
| 5,788,467 | 8/1998 | Zenitani et al. | 361/695 |

*Primary Examiner*—Leo P. Picard
*Assistant Examiner*—Boris L. Chervinsky
*Attorney, Agent, or Firm*—Blakely, Sokoloff, Taylor & Zafman LLP

[57] ABSTRACT

A cooling assembly is disclosed. In one embodiment, the cooling assembly includes a fan for use to direct cool air onto heat dissipating electronic components, and a linear air guiding duct-housing combination for use to house the fan and to guide the cool air to the fan. The linear air guiding duct-housing combination is constituted with material(s) and/or structural supports that allow the cooling assembly to be mounted in a cantilever manner against a chassis wall of a chassis, overhanging the heat dissipating electronic components. In one embodiment, the cooling assembly further includes an air hood coupled to the linear air guiding duct-housing combination to facilitate in-take of cool air from a direction angular to the linear air guiding duct-housing combination.

12 Claims, 7 Drawing Sheets

FAN DUCT MODULE

RELATED APPLICATION

This application is a continuation-in-part application to U.S. patent application Ser. No. 09/015,423, entitled "Fan Duct Module", filed on Jan. 29, 1998.

BACKGROUND OF THE INVENTION

1. Field of the Invention

The present invention relates to an apparatus for cooling components within an electronics or a computer system enclosure. More specifically, the invention relates to an apparatus for cooling the core logic components of a computer system.

2. Background Information

Integrated circuits (ICs) are typically housed within a plastic or ceramic package. The packages have leads or surface pads that are soldered to a printed circuit board. The circuit board and package are often located within an enclosed chassis that contains other circuitry associated with the electronic system such as peripherals, memory cards, video cards, power supplies, etc. The chassis typically contains fans that remove the heat generated by the IC and other system components.

Figure 1A:
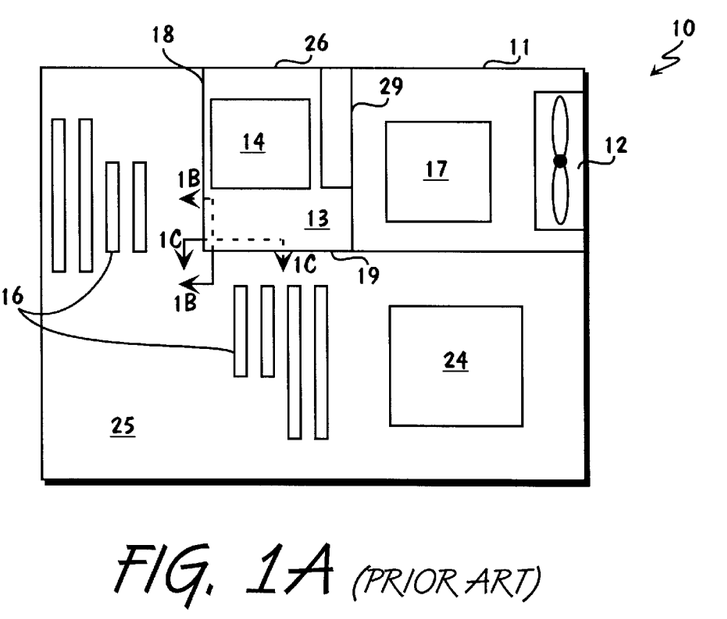
FIGS. 1A–1C illustrates a top view and two cross sectional views of a prior art computer system enclosure.
Figure 1B:
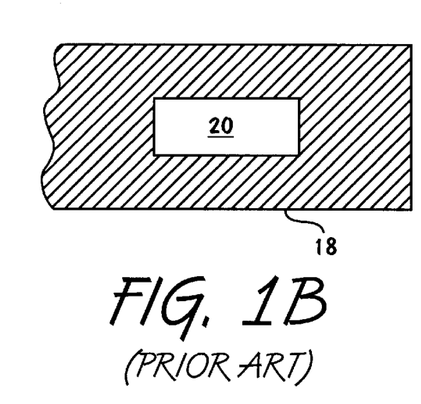
Figure 1C:
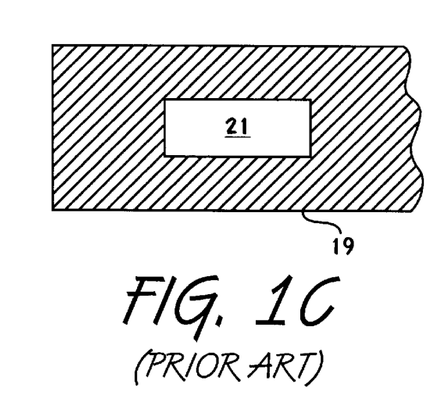

It is desirable to have a high rate of heat transfer from the IC package in order to maintain the junction temperatures of the IC within safe operating limits. In the case of modern microprocessors, employed in many electronic systems, computer systems in particular, millions of transistors in internal circuitry are typically employed, thereby requiring some type of cooling mechanism; otherwise, excessive junction temperatures may affect the performance of the circuit and cause permanent degradation of the device. Furthermore, in order for computer system manufacturers to remain profitable while facing the precipitous price erosion of computer systems, the manufacturers need to analyze and attempt to reduce the pricing of each computer system component. Hence, having standardized, efficient, reliable and cost effective heat removal methods has become critical in the design of computer system enclosures. One prior art system utilizing an exhaust fan and some air ducts for cooling in a computer system enclosure is shown in FIGS. 1A, 1B and 1C (Nelson in U.S. Pat. No. 5,691,883, issued on Nov. 25, 1997).

FIG. 1A illustrates a top view of the prior art system. Enclosure 10 comprises a variety of components including a power supply 17, microprocessor 14, peripherals 24 and cards 16. Cards 16 may comprise any of a number of components, such as, for example, memory cards, modem cards, video cards, daughter boards, etc. Peripherals 24 may include a floppy or hard disk driver or a number of other peripheral devices commonly known in the art.

Enclosure 10 is divided primarily into three sections. These include card slot and peripheral compartment 25, power supply compartment 11, and air duct 13. As illustrated, compartment 25 contains peripherals 24 and cards 16. Compartment 11 contains power supply 17 and the cooling system fan 12. Air duct 13 houses the computer system processor 14.

The cooling fan 12 resides in power supply compartment 11. Fan 12 pulls air into enclosure 10 by creating a low pressure zone within the power supply compartment 11. Air duct 13 provides an air flow path from opening 26, at the exterior of enclosure 10, to an inlet opening 29 of compartment 11. The air duct is configured to direct cool air from the exterior of enclosure 10 across processor 14. By passing cool, unheated air over processor 14, a maximum achievable heat transfer is established across the processor. As the air flow passes over processor 14, it is heated. The heated air then passes along air duct 13 into compartment 11 through opening 29. In order to provide cooling to compartment 25, an air flow is established by providing openings 20 and 21 within air duct walls 18 and 19, respectively. (See FIGS. 1B and 1C.)

Although the cooling method and system of FIG. 1 is well established, some problems still exist. First, the enclosure with the previously described air duct, the fan, and all the openings can only operate with certain computer board designs. In other words, since components such as the power supply, various add-on cards, etc. can only reside in particular compartments of the enclosure, users' abilities to upgrade their computer boards and reuse the enclosure are severely hampered. Secondly, the cooling mechanism seems to focus more on the processor and not the rest of the system. As a result, other compartments of the enclosure will not receive cool, ambient air directly from the exterior of the enclosure, but will instead receive heated air after the air has already passed over the processor. Thus, cooling to other parts of the computer system may be ineffective, and more heat sinks are likely required to compensate for this shortcoming. Undoubtedly, these additional heat sinks will increase the cost of manufacturing computer systems. Lastly, the prior art describes a cooling mechanism which is built into the computer chassis. Because of the extra complexity in including the cooling system in the chassis's structure, implementing the invention described in FIG. 1A is certainly more costly than building the cooling and structural components separately and then assembling them together.

Therefore, an apparatus and method is needed to solve the aforementioned problems associated with using an one fan cooling system which is part of a computer system enclosure.

SUMMARY OF THE INVENTION

A cooling assembly is disclosed. In one embodiment, the cooling assembly includes a fan for use to direct cool air onto heat dissipating electronic components, and a linear air guiding duct-housing combination for use to house the fan and to guide the cool air to the fan. The linear air guiding duct-housing combination is constituted with material(s) and/or structural supports that allow the cooling assembly to be mounted in a cantilever manner against a chassis wall of a chassis, overhanging the heat dissipating electronic components.

In one embodiment, the cooling assembly further includes an air hood coupled to the linear air guiding duct-housing combination to facilitate in-take of cool air from a direction angular to the linear air guiding duct-housing combination.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 2:
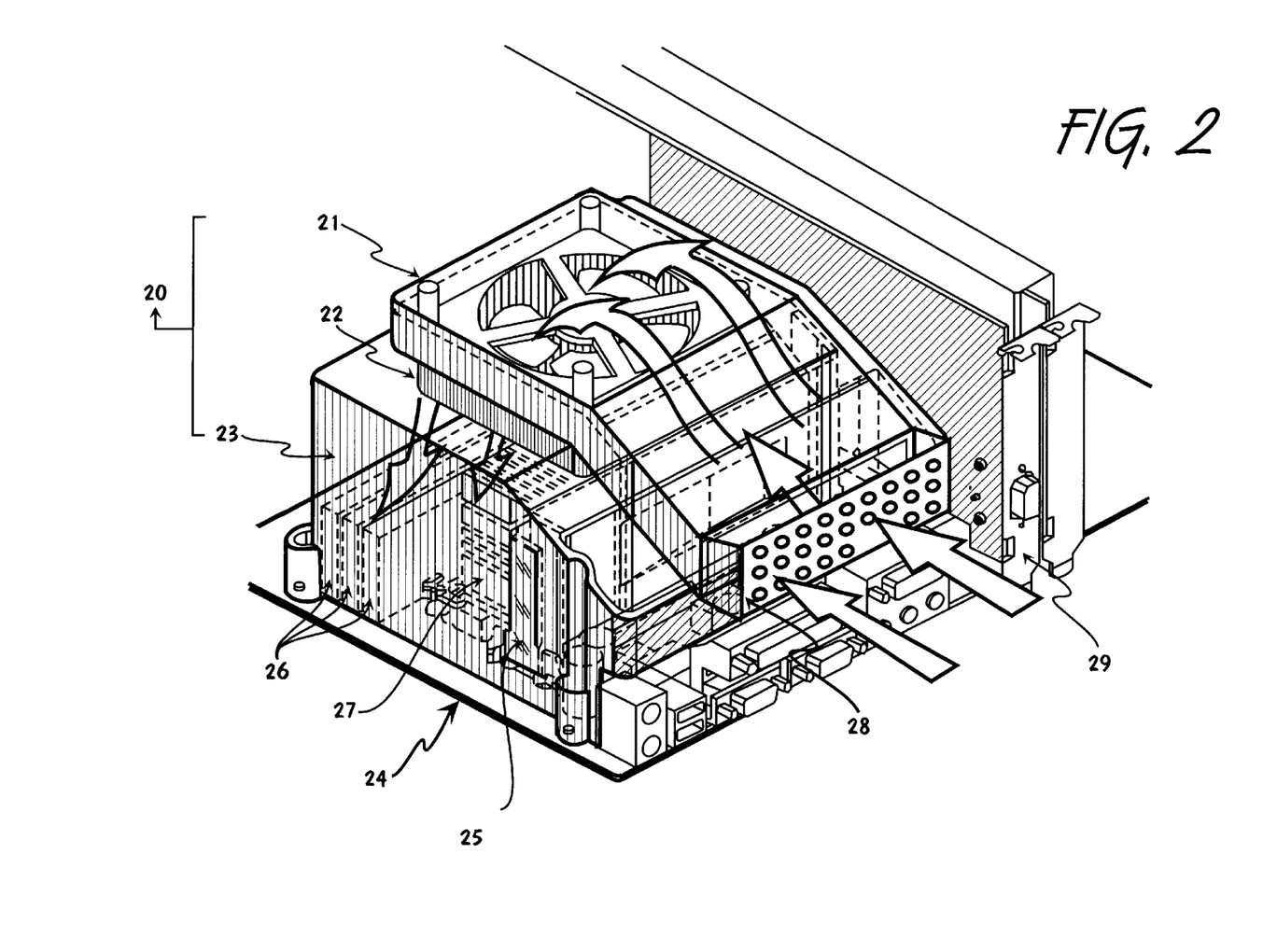
FIG. 2 illustrates a perspective view of a first embodiment of the fan duct module of the present invention with arrows indicating the air flow through the module.

FIG. 2 illustrates the a perspective view of a first embodiment of the present invention (looking in from the "backside"). The first embodiment of the present invention consists of an air-guiding duct 21, a fan 22 that is attached to the duct 21 and a base 23 which covers electronic components that are affixed on an electronic or a computer system board 24. System board 24 comprises a variety of components including, processor 25, memory 26, graphics component 29 and chipset located underneath heat sink 27. In addition, an enclosure 20 is formed by fastening base 23 to system board 24. Thus, components such as processor 25, memory 26 and the mentioned chipset are inside of enclosure 20.

As has been described previously, the cooling fan 22 of the present invention is attached to the air-guiding duct 21. Fan 22 pulls cool exterior air into enclosure 20 through air-guiding duct 21 and vent 28. More specifically, air external to enclosure 20 enters vent 28 and is channeled in an enclosed channel of air-guiding duct 22 so the cool air does not pass over any heat-generating components prior to reaching processor 25, memory 26, the chipset underneath heat sink 27 and graphics component 29. As a result, processor 25, memory 26, the chipset and graphics component 29 are able to receive cool exterior outside air, typically 15° to 20° (Fahrenheit) lower than that found in prior art enclosures.

Figure 3:
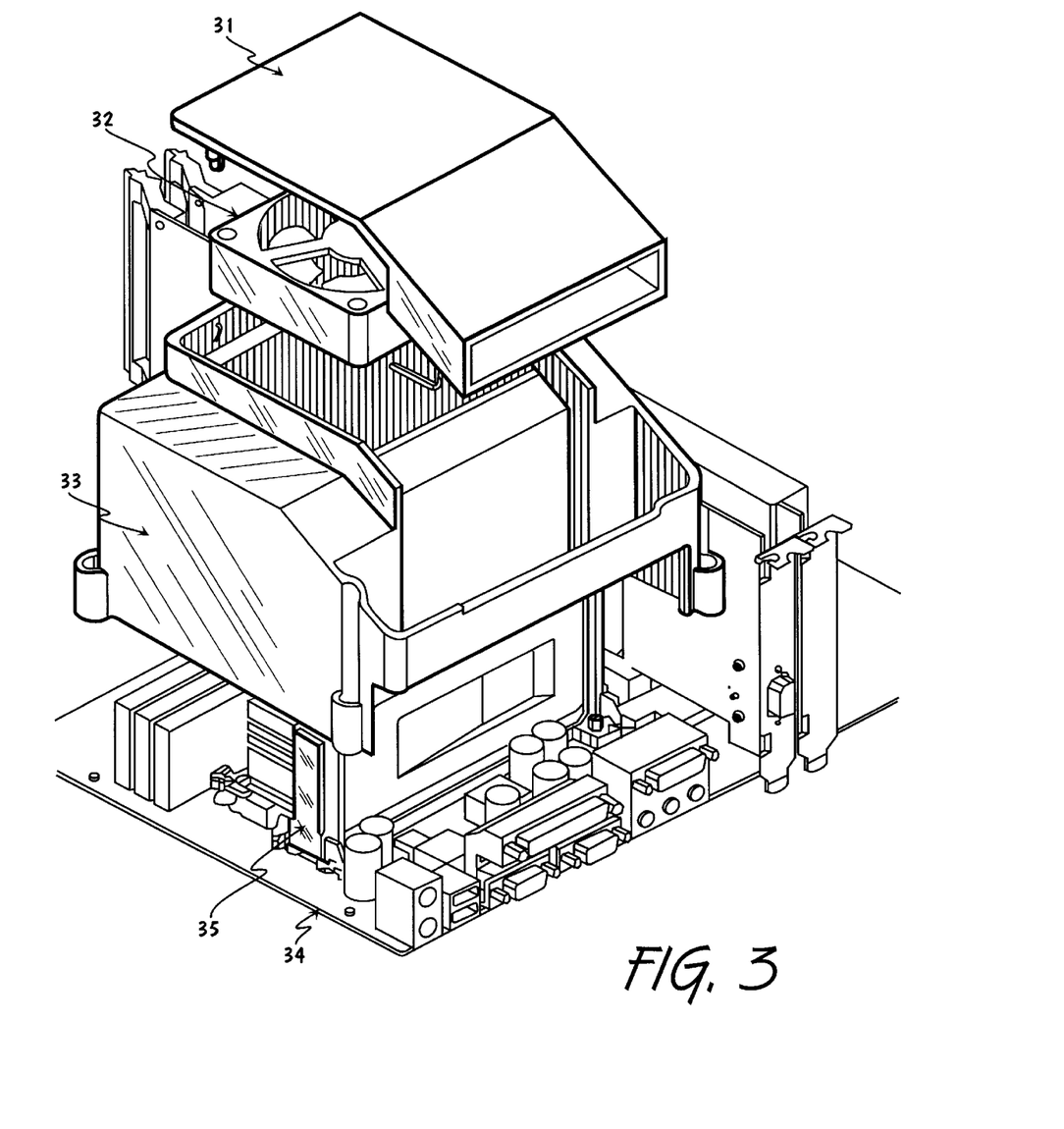
FIG. 3 illustrates an exploded view of the first embodiment.

Moreover, as shown in FIG. 3, air-guiding duct 31, fan 32, base 33 and system board 34 are modular components. Thus, each of these mentioned parts can be manufactured independently. Additionally, system board 34 uses a standard CPU retainer 35. The advantages of using standardized parts or ordinary parts produced by multiple manufacturers are: low cost and ample availability for consumers. Further, if computer systems are indeed built with standardized or off-the-shelf common parts instead of proprietary and inflexible ones, manufacturers may be motivated or even forced to focus on their specialties and develop the most cost effective fans, bases, system boards, air ducts, and so on in order to remain competitive in the marketplace. The end result will ultimately benefit consumers, because the quality of produced goods will be better and the prices will be lower.

Having mentioned one embodiment of the present invention, it should be appreciated that the positioning of air-guiding duct 31 and fan 32 may vary as long as the coupling of them delivers fresh, unheated air directly from the outside of computer system directly to the components on the computer system boards. The sizes and shapes of air-guiding duct 31 and fan 32 will vary depending upon the particular cooling requirements of the enclosure components.

Figures 4, 5:
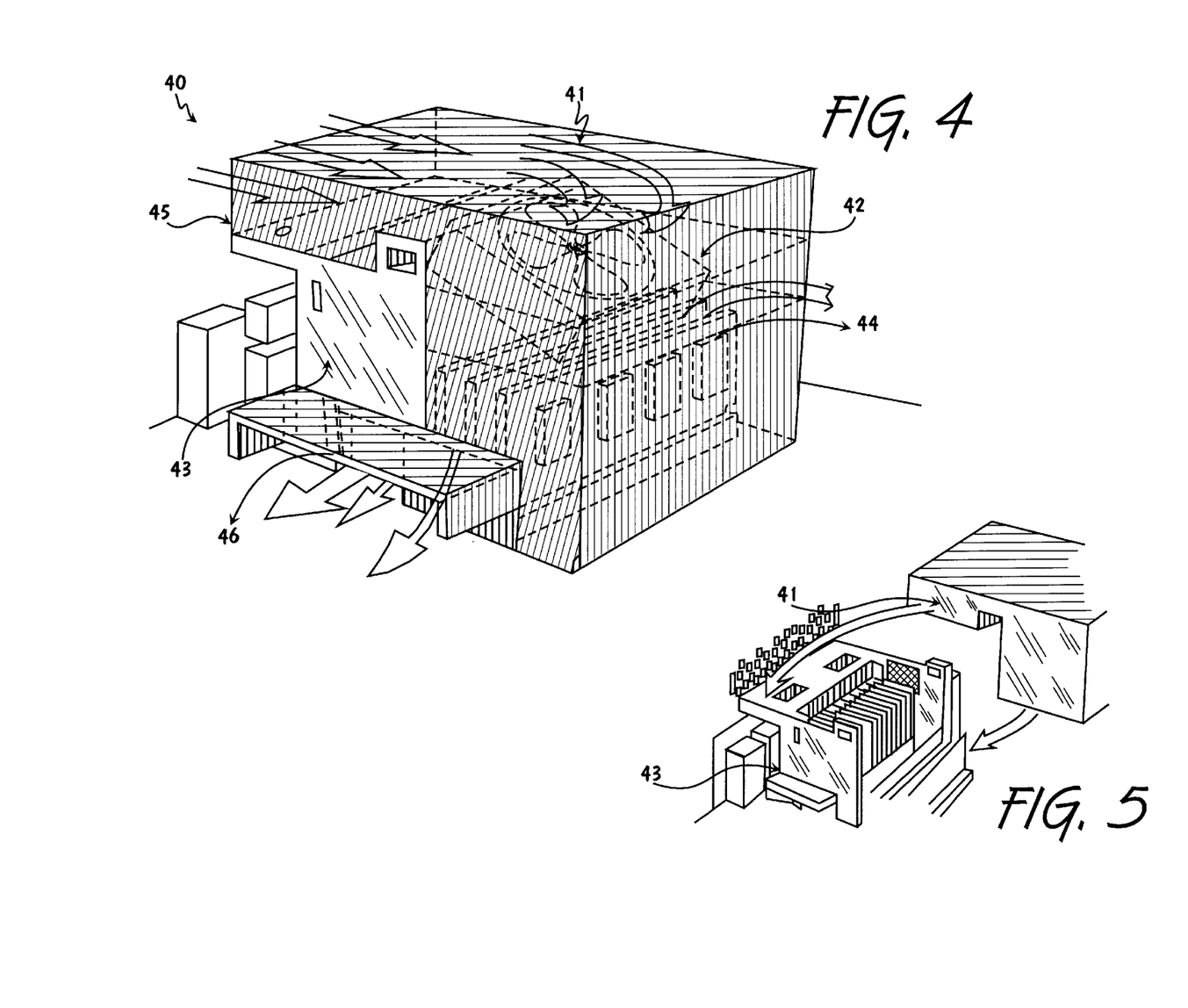
FIG. 4 illustrates the front view of a second embodiment with arrows indicating the air flow through the enclosure.
FIG. 5 illustrates an exploded view of the second embodiment with arrows indicating how the separate modules can be assembled.

FIG. 4 illustrates a second embodiment of the present invention. Enclosure 40 is formed by fastening the modular cooling apparatus 41/42 to the base retention module 43. Base retention module 43 contains the system board and houses all the core electronic components such as memory 44 and the processor. It should however be appreciated that system board can extend beyond base 43. As shown in this embodiment, fan 42 is installed inside of air-guiding duct 41. Air-guiding duct 41 provides an air path or channel from the outside of enclosure 40 directly to the input side of the fan 42 and to the inside of the enclosure through air input opening 45. Fan 42 is angled slightly inside of air-guiding duct 41 to deliver fresh ambient air substantially perpendicularly towards all the core electronic components that are affixed on base retention module 43. It should be again noted that this air is not pre-heated prior to reaching all the devices on base retention module 43. After cool air has passed over the components on base retention module 43, the air is heated by all those heat-generating devices. The heated air exits enclosure 40 by following the arrows in FIG. 4 through exhaust opening 46. Although the exhausting air is heated, it is at high velocity and can be used to cool additional electronic components.

Additionally, FIG. 5 demonstrates the modularity of modular cooling apparatus 41/42 and base retention module 43. Similar to the first described embodiment, each module can be built separately. Using the same reasoning in the first embodiment, consumers again will benefit from such an arrangement.

Even though fan 42 resides within the air-guiding duct 41 in the foregoing description, it should be understood that fan 42 does not need to be situated inside air-guiding duct 41. The first embodiment clearly demonstrates one alternative where such a requirement is not necessary. Further, the exact angling of fan 42 within air-guiding duct 41 will depend on the location of components that are affixed on base retention module 43. No particular angle is required or implied in the present invention as the coupling of fan 42 and air-guiding duct 41 delivers fresh, unheated air from the outside of computer system directly to the components on base retention module 43 in a substantially perpendicular direction relative to the plane of the circuit boards. Lastly, the exhaust opening 46 for exhausting heated air from enclosure 40 to the outside of enclosure 40 can be positioned anywhere that would efficiently serve its function and aid in additional cooling of other components.

Figure 6A:
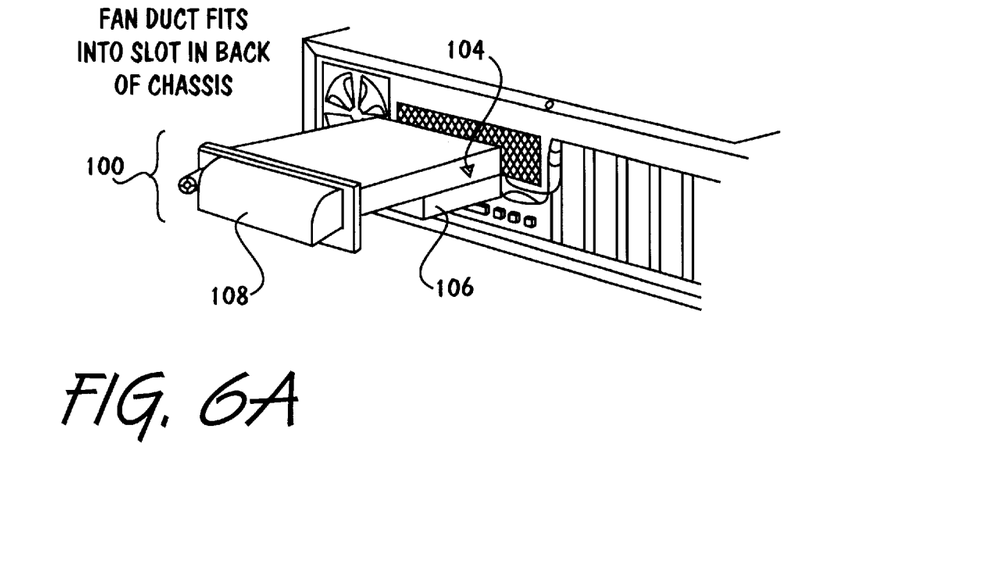
FIGS. 6a–6b illustrate an exterior and an interior perspective view of the third embodiment.
Figure 6B:
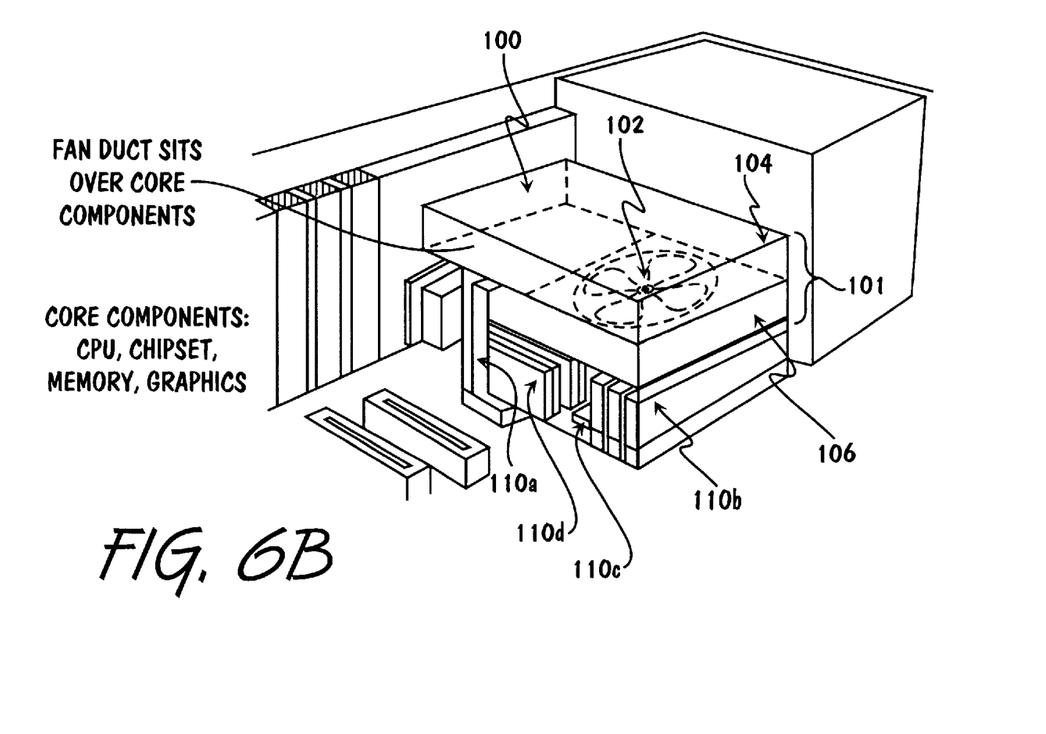

FIGS. 6a–6b illustrate an outside and an inside perspective view of a third embodiment of the cooling assembly of the present invention. As illustrated, for the third embodiment, the cooling assembly 100 includes a fan 102, a linear air guiding duct-housing combination 101 and optional air hood 108. Similar to the earlier embodiments, fan 102 is used to direct cool air onto heat dissipating electronic components 110, such as core components of a computer system, i.e. processor(s) 110a, memory modules 110b, chipsets 110c and so forth. Likewise, linear air guiding duct-housing combination 101 is used to house fan 102 and guide the cool air to fan 102. The third embodiment differs from the earlier described embodiment in that linear air guiding duct-housing combination 101 is constituted with material(s) and/or structural supports that allow cooling assembly 100 to be mounted in a cantilever manner against a chassis wall of a chassis, overhanging heat dissipating electronic components 110. As a result, cool air may be efficiently directed directly onto the heat dissipating electronic components 110. Furthermore, those skilled in the art will appreciate that the novel cantilever manner of mounting that results in the cooling assembly overhanging the heat dissipating electronic components is less restrictive on the motherboard, and provides more flexibility to placement of the heat dissipating electronic components as well as the number of heat dissipating electronic components that can be included in the system.

Before further describing the third embodiment, it should be noted that the term "linear" as used in the present application is intended to convey the notion of the air guiding duct-housing combination having a geometry shape that substantially extends in one direction linearly. It is not intended to restrict the air guiding duct-housing combination to a straight longitudinal rectangular or cylindrical shape. As will be readily apparent from the description to follow, the air guiding duct-housing combination may be formed in any number of geometric shapes, so long it extends in one direction in a substantially linear fashion, allowing the desired cantilever manner of mounting of the cooling assembly.

Air hood 108 is coupled to linear air guiding duct-housing combination 101 to facilitate in-take of the cool air from a direction angular to the linear air-guiding duct. For the illustrated embodiment, cool air is taken from a direction perpendicular to the linear axis of linear air guiding duct-housing combination 101. Those skilled in the art will appreciate that the angular manner of cool air in-take advantageously allow cooler air to be taken from a direction that is directed away from where the hot exhaust air of the power supply are emitted.

It is expected that the combined increase in cooling efficiency resulting from the overhanging configuration and directed air in-take, smaller heat sinks, such as the illustrated stepped heat sinks 110d, may be employed for processor 110a.

Figure 7A:
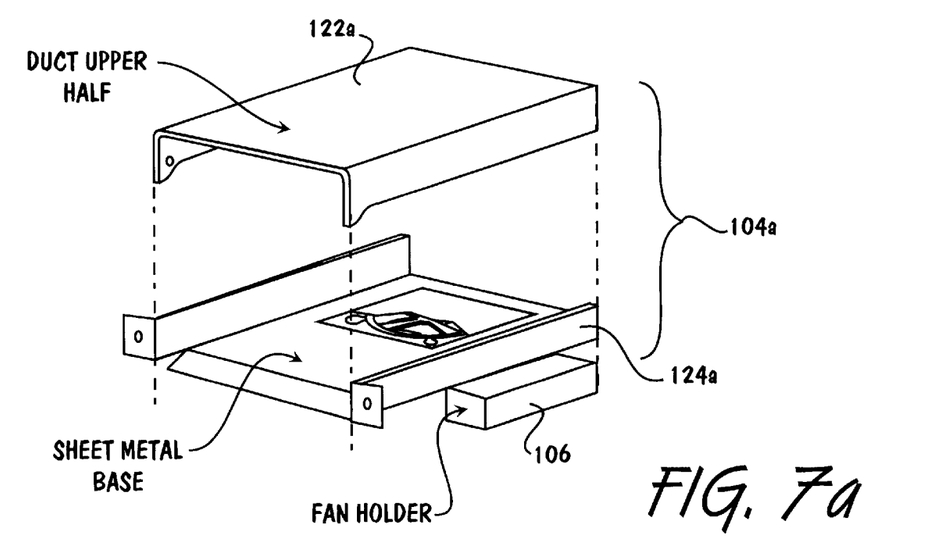
FIGS. 7a–7b illustrate partial exploded views of two embodiments of the linear air guiding duct-housing combination.
Figure 7B:
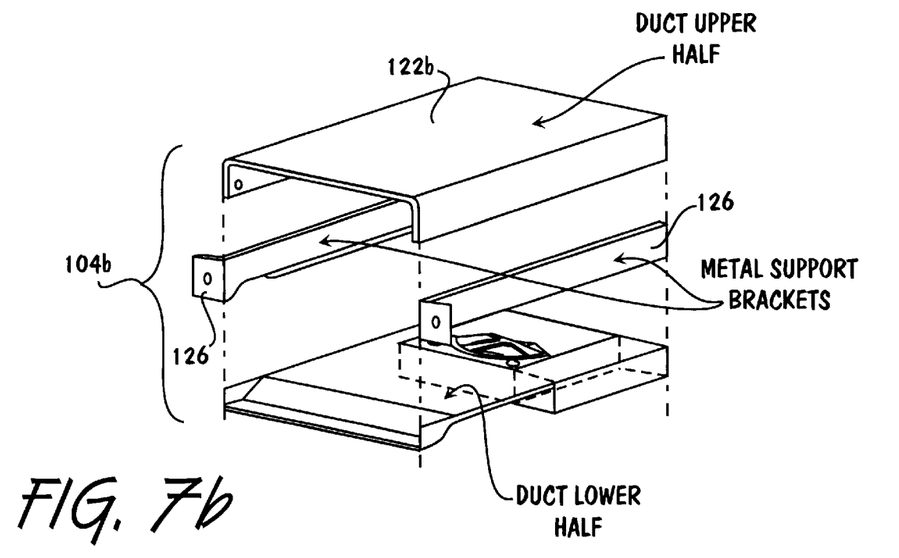

FIGS. 7a–7b illustrate partial exploded views of two embodiments of linear air guiding duct-housing combination 101. As illustrated in FIGS. 7a–7b, for both embodiments, linear air guiding duct-housing combination 101 includes linear air guiding duct 104 and fan holder 106. Air-guiding duct 104 has an air in-flow opening 112 disposed at a side end, and an air out-flow opening 114 disposed at a bottom surface near an opposite side end. Fan holder 106 is used to hold and couple fan 102 to air out-flow opening 114 of air-guiding duct 104. Before the two embodiments are further described, it should be noted that linear air guiding duct-housing combination 101 may also be formed with a uni-body construction, combining both air guiding duct 104 and fan holder 106 into a single part.

Referring first to FIG. 7a, first embodiment of linear air guiding duct-housing combination 101 is formed with linear air guiding duct 104a having linear upper half 122a, and linear lower half 124a. In accordance with the present invention, at least linear lower half 124a is made of materials of sufficient strength, such as metals, to enable the desired cantilever manner of mounting of the cooling assembly. Referring now to FIG. 7b, second embodiment of linear air guiding duct-housing combination 101 is formed with linear air guiding duct 104b having linear upper half 122b, linear lower half 124b, and two support brackets 126. In accordance with the present invention, at least the two support brackets 126 are made of materials of sufficient strength, such as metals, to enable the desired cantilever manner of mounting of the cooling assembly.

Figure 8A:
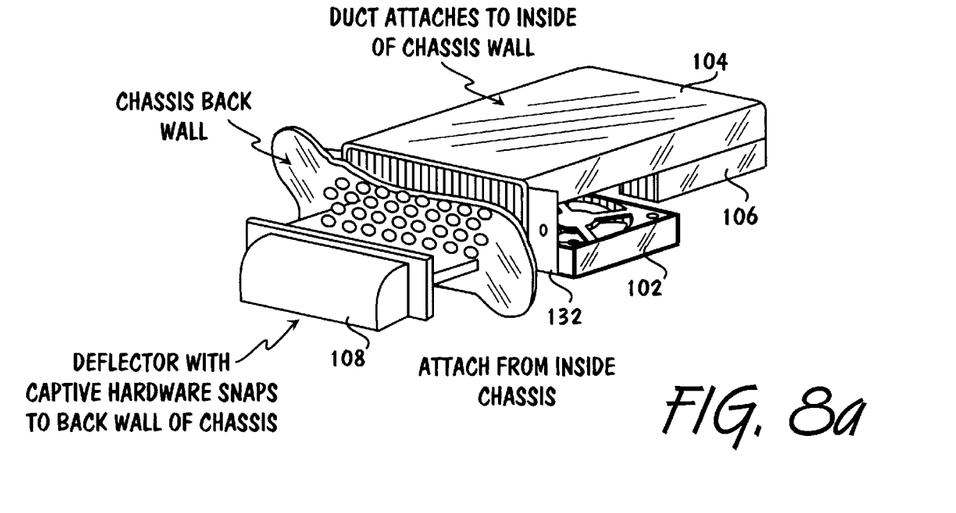
FIGS. 8a–8b illustrate partial exploded views of two approaches to attaching the third embodiment to a computer chasis.
Figure 8B:
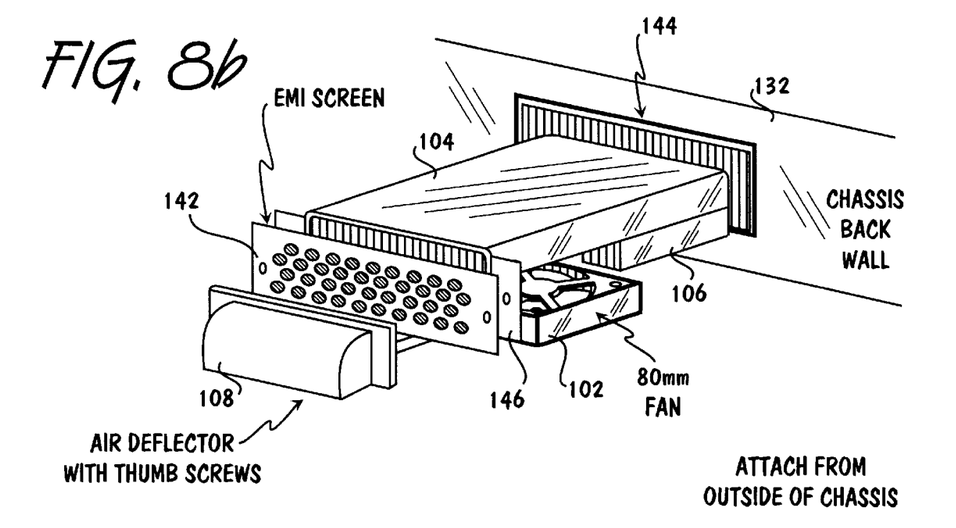

FIGS. 8a–8b illustrate partial exploded views of two approaches to attaching the third embodiment of the cooling assembly to the computer chasis. As illustrated in FIG. 8a, cooling assembly 100 is mounted in the desired cantilever manner against chassis wall 132 of the chassis with vented area 134 of chassis wall 132 disposed in between linear air-guiding duct 104 and air hood 108. As illustrated in FIG. 8b, cooling assembly 100 further includes vent plate 142 that also serves as an EMI shield, disposed between linear air-guiding duct 104 and air hood 108. Chassis wall 132 also includes opening 144 to allow cooling assembly to be "inserted" into the interior space of the chassis. Linear air-guiding duct 104 also includes flanges 146 to facilitate the desired cantilever manner of mounting assembly 100.

Various embodiments of an improved modular cooling mechanism for a computer system has been described. Although the present invention has been described particularly with reference to the figures, it will be apparent to one of ordinary skill in the art that the present invention may be practiced with many changes and modifications without departing from the spirit and scope of the present invention.

Thus, a fan duct cooling apparatus has been described.

What is claimed is:

1. A cooling assembly comprising:
   (a) a fan for use to direct cool air onto heat dissipating electronic components;
   (b) an air guiding duct-housing combination for use to house the fan and to guide cool air to the fan, the air guiding duct-housing combination having a geometric shape and being constituted with material(s) and/or structural supports that allow the cooling assembly to be mounted in a cantilever manner against a chassis wall of a chassis, overhanging the heat dissipating electronic components; and
   (c) an air hood coupled to the air guiding duct-housing combination to facilitate in-take of the cool air from a direction angular to the linear air guiding duct-housing combination, and the cooling assembly is mounted in said cantilever manner against the chassis wall of the chassis with a vented area of the chassis wall disposed in between the air guiding duct-housing combination and the air hood.

2. The cooling assembly of claim 1, wherein the air guiding duct-housing combination comprises a linear air guiding duct having a linear upper half and a linear lower half, with at least the linear lower half being constituted with materials of sufficient strength to enable said cantilever manner of mounting of the cooling assembly.

3. The cooling assembly of claim 1, wherein the air guiding duct-housing combination comprises a linear air guiding duct having a linear upper half, a linear lower half, and a plurality of support brackets with at least the plurality of support brackets being made of materials of sufficient strength to enable said cantilever manner of mounting of the cooling assembly.

4. The cooling assembly of claim 1, wherein the air guiding duct-housing combination comprises
   (b.1) a linear air guiding duct having an air in-flow opening disposed at a side end and an air out-flow opening disposed at a bottom surface near an opposite side end; and
   (b.2) a fan holder for holding the fan and coupling the fan to the air out-flow opening of the linear air guiding duct.

5. The cooling assembly of claim 1, wherein the cooling assembly further comprises (d) a vent plate that also serves as an EMI shield, and disposed between the linear air guiding duct-housing combination and the air hood.

6. A computer system comprising:
   (a) a processor;
   (b) a plurality of memory modules;
   (c) a chassis housing the processor and the plurality of memory modules, the chassis having a chassis wall; and
   (d) a cooling assembly mounted against the chassis wall in a cantilever manner overhanging over the processor and the memory modules to direct cool air onto the processor and the memory modules to cool the processor and the memory modules, the cooling assembly having
      (d.1) a fan for use to direct said cool air onto the processor and the memory modules,
      (d.2) a linear air guiding duct-housing combination for use to house the fan and to guide the cool air to the fan, the linear air guiding duct-housing combination being constituted with material(s) and/or structural supports that allow the assembly to be mounted in said cantilever manner,
      (d.3) an air hood coupled to the linear air guiding duct-housing combination to facilitate in-take of the cool air from a direction angular to the linear air guiding duct-housing combination;
   wherein the cooling assembly is mounted in said cantilever manner against the chassis wall of the chassis with a vented area of the chassis wall disposed in between the linear air guiding duct-housing combination and the air hood.

7. The computer system of claim 6, wherein the linear air guiding duct-housing combination comprises a linear air guiding duct having a linear upper half and a linear lower half, with at least the linear lower half being constituted with materials of sufficient strength to enable said cantilever manner of mounting of the cooling assembly.

8. The computer system of claim 6, wherein the linear air guiding duct-housing combination comprises a linear air guiding duct having a linear upper half, a linear lower half, and a plurality of support brackets with at least the plurality of support brackets being made of materials of sufficient strength to enable said cantilever manner of mounting of the cooling assembly.

9. The computer system of claim 6, wherein the linear air guiding duct-housing combination comprises
   (d.2.1) a linear air guiding duct having an air in-flow opening disposed at a side end and an air out-flow opening disposed at a bottom surface near an opposite side end; and
   (d.2.2) a fan holder for holding the fan and coupling the fan to the air out-flow opening of the linear air guiding duct.

10. The computer system of claim 6, wherein the cooling assembly further comprises (d.4) a vent plate that also serves as an EMI shield, and disposed between the linear air guiding duct-housing combination and the air hood.

11. The computer system of claim 6, wherein the computer system further comprises one or more chipsets, which are also disposed underneath the overhanging cooling assembly, and the cooling assembly also serves to direct cool air onto the chipsets to cool the chipsets.

12. An apparatus comprising:
   (a) a plurality of heat dissipating electronic components;
   (b) a chassis having a plurality of chassis walls to house the electronic components;
   (c) a cooling assembly mounted against one of the chassis walls in a cantilever manner overhanging over the electronic components to direct cool air onto the electronic components to cool the electronic components, the cooling assembly having
      (c.1) a fan for use to direct said cool air onto the electronic components,
      (c.2) a linear air guiding duct-housing combination for use to house the fan and to guide the cool air to the fan, the linear air guiding duct-housing combination being constituted with material(s) and/or structural supports that allow the assembly to be mounted in said cantilever manner,
      (c.3) an air hood coupled to the linear air guiding duct-housing combination to facilitate in-take of the cool air from a direction angular to the linear air guiding duct-housing combination
   wherein the cooling assembly is mounted in said cantilever manner against the chassis wall of the chassis with a vented area of the chassis wall disposed in between the linear air guiding duct-housing combination and the air hood.

* * * * *